United States Patent
Murata

(10) Patent No.: US 7,750,330 B2
(45) Date of Patent: Jul. 6, 2010

(54) DEVICE AND METHOD FOR IDENTIFYING RECORDING MEDIUM AND IMAGE FORMING APPARATUS

(75) Inventor: Takuma Murata, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 11/972,782

(22) Filed: Jan. 11, 2008

(65) Prior Publication Data

US 2008/0169438 A1  Jul. 17, 2008

(30) Foreign Application Priority Data

Jan. 11, 2007  (JP)  .............................. 2007-003853

(51) Int. Cl.
*G01N 21/86*  (2006.01)
*H01L 27/00*  (2006.01)

(52) U.S. Cl. .................................. 250/559.4; 250/208.1

(58) Field of Classification Search .............. 250/559.4, 250/221, 559.22, 559.44, 559.01, 559.04–559.08, 250/559.11, 559.16, 559.2, 559.39, 559.41, 250/208.1; 356/601, 446, 448, 71, 237.1, 356/237.5, 238.1, 239.1, 239.3, 238.8; 347/101, 347/102; 358/462, 468, 486
See application file for complete search history.

(56) References Cited

U.S. PATENT DOCUMENTS

| | | | |
|---|---|---|---|
| 4,722,008 A * | 1/1988 | Ibaraki et al. | ................ 382/192 |
| 6,291,829 B1 * | 9/2001 | Allen et al. | ............ 250/559.07 |
| 7,125,114 B2 * | 10/2006 | Tsujimoto | .................... 347/105 |

FOREIGN PATENT DOCUMENTS

| | | |
|---|---|---|
| JP | 2002-182518 A | 6/2002 |
| JP | 2003-302208 A | 10/2003 |

* cited by examiner

*Primary Examiner*—Georgia Y Epps
*Assistant Examiner*—Pascal M Bui-Pho
(74) *Attorney, Agent, or Firm*—Canon U.S.A., Inc. I.P. Divsion

(57) ABSTRACT

An identification device operable to identify a type of a recording medium includes an irradiation unit configured to irradiate the recording medium with light, a reading unit configured to read the light that is irradiated from the irradiation unit and that is reflected from the recording medium to obtain an image, a processing unit configured to process the image obtained by the reading unit to output a plurality of pixel data items each having a light intensity value, a calculation unit configured to calculate a value representing amounts of change by which the light intensity values of the plurality of pixel data items continuously increase and decrease, and an identification unit configured to identify the type of the recording medium on the basis of the value representing the amounts of change calculated by the calculation unit.

10 Claims, 13 Drawing Sheets

FIG. 1
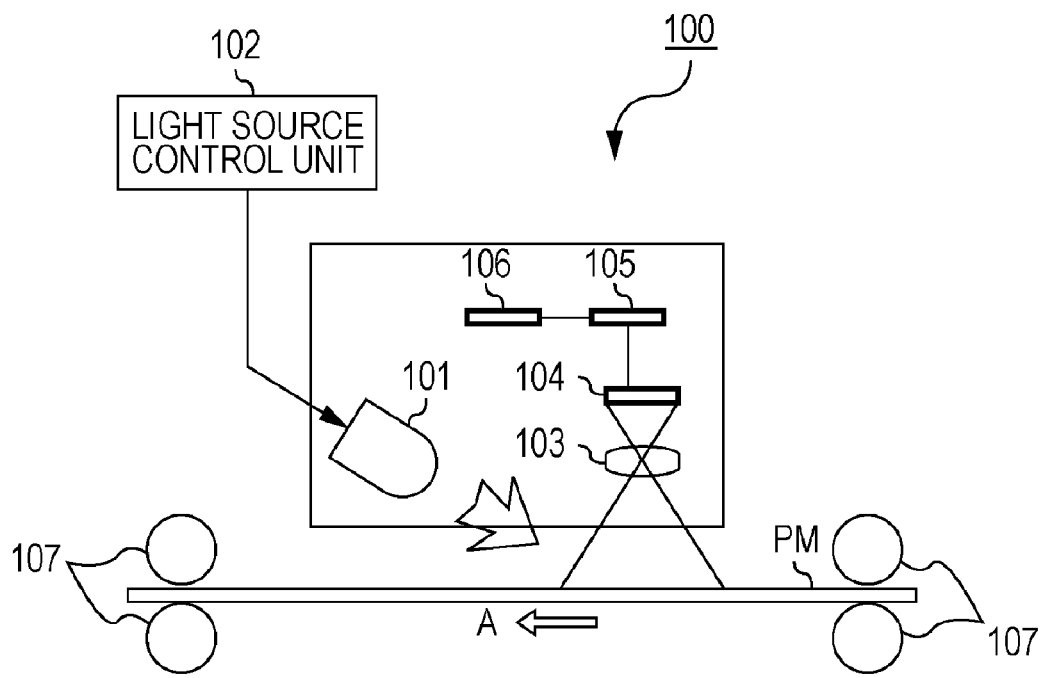
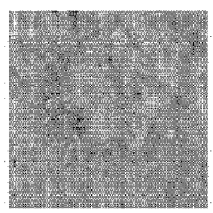
FIG. 2A
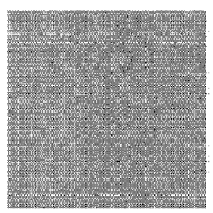
FIG. 2B
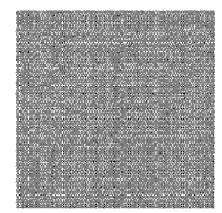
FIG. 2C
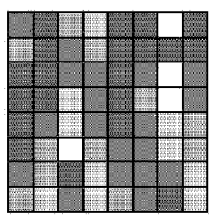
FIG. 2D
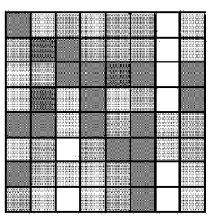
FIG. 2E
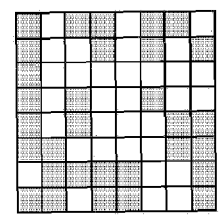
FIG. 2F FIG. 3
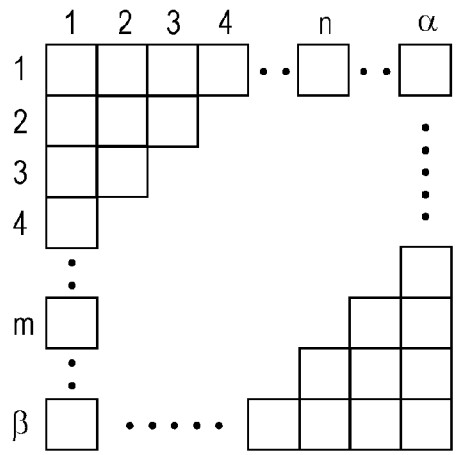
FIG. 4
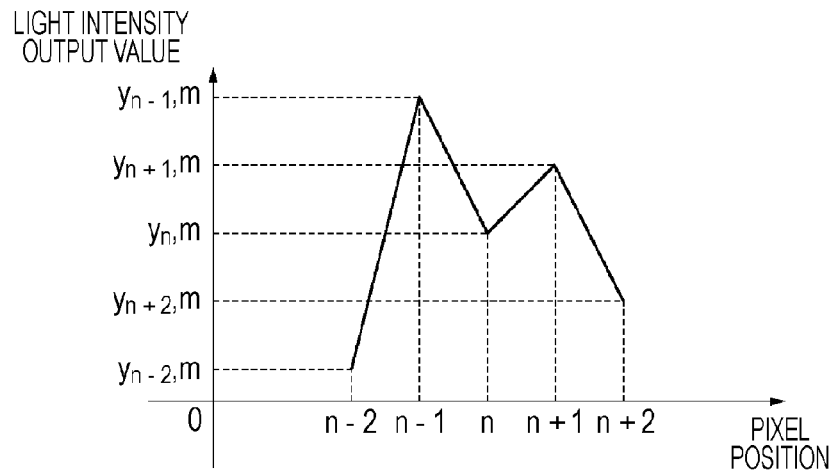
FIG. 5
| PIXEL (m) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| LIGHT INTENSITY OUTPUT VALUE ($y_n, 1$) | 179 | 170 | 150 | 150 | 150 | 153 | 153 | 153 | 168 | 188 | 200 | 193 | 178 | 161 | 161 |

FIG. 6

| PIXEL (m) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| DIFFERENCE VALUE ($a_{n,1}$) | / | -9 | -20 | 0 | 0 | 3 | 0 | 0 | 15 | 20 | 12 | -7 | -15 | -17 | 0 |
| SIGN ($b_{n,1}$) | / | -1 | -1 | 0 | 0 | 1 | 0 | 0 | 1 | 1 | 1 | -1 | -1 | -1 | 0 |
| CONSECUTIVE COUNT VALUE ($c_{n,1}$) | / | 0 | 1 | 0 | 0 | 0 | 0 | 0 | 0 | 1 | 2 | 0 | 1 | 2 | 0 |

FIG. 7

| ROUGH PAPER | 3142 | 3192 | 3180 | 3102 | 2952 | 3058 | 3438 | 3066 | 3215 | 3127 | 3475 | 3188 | 3230 | 3086 | 3072 | 3172 |
|---|---|---|---|---|---|---|---|---|---|---|---|---|---|---|---|---|
| PLAIN PAPER (1) | 2749 | 2722 | 2676 | 2553 | 2800 | 2847 | 2734 | 2844 | 2877 | 2641 | 2637 | 2775 | 2787 | 2816 | 2765 | 2677 |
| PLAIN PAPER (2) | 2328 | 2248 | 2466 | 2547 | 2411 | 2517 | 2433 | 2429 | 2365 | 2385 | 2487 | 2432 | 2374 | 2432 | 2353 | 2341 |
| PLAIN PAPER (3) | 2510 | 2467 | 2285 | 2300 | 2492 | 2385 | 2562 | 2463 | 2398 | 2544 | 2544 | 2390 | 2498 | 2578 | 2527 | 2448 |
| GLOSSY PAPER (1) | 2240 | 2200 | 2334 | 2339 | 2283 | 2270 | 2480 | 2324 | 2222 | 2272 | 2536 | 2406 | 2284 | 2303 | 2359 | 2240 |
| GLOSSY PAPER (2) | 2482 | 2344 | 2410 | 2464 | 2436 | 2416 | 2505 | 2263 | 2234 | 2607 | 2439 | 2269 | 2448 | 2327 | 2517 | 2322 |
| GLOSSY FILM | 2427 | 2545 | 2404 | 2607 | 2560 | 2583 | 2605 | 2317 | 2491 | 2383 | 2407 | 2507 | 2415 | 2435 | 2414 | 2438 |

FIG. 10

| PIXEL (m) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| LIGHT INTENSITY OUTPUT VALUE $(y_{n,1})$ | 126 | 131 | 127 | 128 | 120 | 120 | 119 | 120 | 120 | 121 | 135 | 105 | 117 | 135 | 123 |

FIG. 11

| PIXEL (m) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| DIFFERENCE VALUE $(a_{n,1})$ | / | 5 | -4 | 1 | -8 | 0 | -1 | 1 | 0 | 1 | 14 | -30 | 12 | 18 | -12 |
| SIGN $(b_{n,1})$ | / | 1 | -1 | 1 | -1 | 0 | -1 | 1 | 0 | 1 | 1 | -1 | 1 | 1 | -1 |
| CONSECUTIVE COUNT VALUE $(c_{n,1})$ | / | 0 | 0 | 0 | 0 | 0 | 0 | 0 | 0 | 0 | 1 | 0 | 0 | 1 | 0 |

FIG. 12

| | | | | | | | | | | | | | | |
|---|---|---|---|---|---|---|---|---|---|---|---|---|---|---|
| ROUGH PAPER | 3194 | 3141 | 3302 | 3251 | 3308 | 3081 | 3437 | 3106 | 3255 | 3147 | 3135 | 3382 | 3082 | 3361 | 3212 | 3152 |
| PLAIN PAPER (1) | 2759 | 2615 | 2672 | 2653 | 2790 | 2798 | 2847 | 2894 | 2857 | 2896 | 2786 | 2582 | 2738 | 2686 | 2581 | 2722 |
| PLAIN PAPER (2) | 2455 | 2298 | 2615 | 2597 | 2614 | 2600 | 2483 | 2479 | 2515 | 2622 | 2537 | 2482 | 2442 | 2482 | 2403 | 2391 |
| PLAIN PAPER (3) | 2650 | 2715 | 2335 | 2350 | 2452 | 2511 | 2612 | 2513 | 2484 | 2495 | 2594 | 2404 | 2499 | 2628 | 2577 | 2498 |
| GLOSSY PAPER (1) | 2290 | 2250 | 2401 | 2389 | 2320 | 2330 | 2530 | 2415 | 2227 | 2232 | 2625 | 2501 | 2433 | 2335 | 2409 | 2290 |
| GLOSSY PAPER (2) | 2532 | 2403 | 2460 | 2451 | 2486 | 2466 | 2555 | 2331 | 2428 | 2657 | 2489 | 2319 | 2498 | 2377 | 2604 | 2273 |
| GLOSSY FILM | 2477 | 2595 | 2445 | 2765 | 2610 | 2633 | 2565 | 2367 | 2514 | 2344 | 2457 | 2575 | 2465 | 2548 | 2446 | 2488 |

FIG. 16

| PIXEL (m) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| LIGHT INTENSITY OUTPUT VALUE ($y_{1,m}$) | 169 | 174 | 174 | 163 | 165 | 167 | 171 | 167 | 181 | 198 | 193 | 178 | 170 | 164 | 158 |

FIG. 17

| PIXEL (m) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| DIFFERENCE VALUE ($a_{1,m}$) | | 5 | 0 | -11 | 2 | 2 | 4 | -4 | 14 | 17 | -5 | -15 | -8 | -6 | -6 |
| SIGN ($b_{1,m}$) | | 1 | 0 | -1 | 1 | 1 | 1 | -1 | 1 | 1 | -1 | -1 | -1 | -1 | -1 |
| MONOTONICALLY INCREASING CONSECUTIVE-NUMBER-OF-TIME COUNT VALUE ($d_{1,m}$) | | 0 | 0 | 0 | 0 | 1 | 2 | 0 | 0 | 1 | 0 | 0 | 0 | 0 | 0 |

FIG. 18

| | 1107 | 1017 | 1116 | 1058 | 1171 | 1212 | 1060 | 1180 | 1168 | 1087 | 1101 | 1087 | 1108 | 1188 | 1173 | 1137 |
|---|---|---|---|---|---|---|---|---|---|---|---|---|---|---|---|---|
| PLAIN PAPER (1) | 834 | 837 | 975 | 995 | 920 | 1000 | 952 | 926 | 850 | 973 | 859 | 811 | 913 | 831 | 894 | 858 |
| PLAIN PAPER (2) | 849 | 875 | 859 | 809 | 857 | 892 | 951 | 832 | 824 | 919 | 919 | 803 | 876 | 939 | 928 | 989 |
| PLAIN PAPER (3) | 707 | 680 | 682 | 718 | 682 | 643 | 669 | 672 | 661 | 683 | 657 | 765 | 673 | 646 | 655 | 682 |
| GLOSSY PAPER (1) | 693 | 720 | 707 | 718 | 716 | 734 | 723 | 651 | 677 | 669 | 737 | 639 | 766 | 659 | 745 | 669 |
| GLOSSY PAPER (2) | 400 | 393 | 453 | 366 | 405 | 365 | 370 | 391 | 458 | 451 | 386 | 434 | 421 | 382 | 394 | 391 |
| GLOSSY FILM | | | | | | | | | | | | | | | | |

DEVICE AND METHOD FOR IDENTIFYING RECORDING MEDIUM AND IMAGE FORMING APPARATUS

BACKGROUND OF THE INVENTION

1. Field of the Invention

The present invention relates to an identification device for identifying the type of a recording medium.

2. Description of the Related Art

Image forming apparatuses such as copiers and laser printers include a latent image bearing member for bearing a latent image thereon, a developer for developing the latent image into a visible toner image, a transfer unit for transferring the toner image onto a recording medium, and a fixing unit for fixing the toner image transferred onto the recording medium. The fixing unit heats and compresses a material to be recorded under predetermined fixing conditions (such as a fixing temperature and a conveying speed at which the recording medium passes through the fixing unit, which are determined in advance depending on the paper type and the like) to fix the toner image onto the recording medium.

Recently, an image forming apparatus including an identification device configured to capture a surface image of a size or type of a recording medium into an operation panel or the like and to identify the type of the recording media, such as glossy paper, plain paper, rough paper, or overhead transparency (OHT) sheet, from a read result (image data) of the surface image has been proposed (see Japanese Patent Laid-Open No. 2002-182518). Such an image forming apparatus sets optimum image forming conditions including a printing density, a transfer bias (voltage value to be applied to the transfer unit), a fixing temperature, and a process speed (image forming speed) on the basis of an identification result of the identification device.

The identification device focuses light reflected from the recording medium onto an image pickup element such as a charge-coupled device (CCD) sensor or a complementary metal oxide semiconductor (CMOS) sensor through a lens, and performs analog-to-digital (A/D) conversion of an analog signal output from the image pickup element to obtain an image of a surface of the recording medium. The identification device identifies the type of the recording medium by, for example, calculating the depth of irregularities in the surface of the recording medium from the image (see Japanese Patent Laid-Open No. 2003-302208). More specifically, the identification device determines a peak-peak value, which is a difference between a maximum light intensity value and a minimum light intensity value for each row in the image of the surface of the recording medium. The determined peak-peak value is compared with a plurality of predetermined threshold values to determine the state of the surface of the recording medium to thereby identify the type of the recording medium, such as glossy paper, plain paper, rough paper, or OHT sheet.

In such existing identification devices, however, if variations in light intensity are large due to variations in intensity of a light source adapted to irradiate the recording medium with light or in transmittance of a lens, variations occur in the peak-peak value determined from images obtained by photographing recording media of the same type. Variations in sensitivity of photoelectric conversion cells of an image pickup element may cause larger variations in the peak-peak value. That is, the variations in the peak-peak value due to the variations of the lens and image pickup element of the identification device might reduce identification accuracy for identifying the type of recording medium. To ensure high identification accuracy, there is a need to reduce variations in light intensity of the light source, variations in transmittance of the lens, and variations in sensitivity of the photoelectric conversion cells. However, if the lens and the image pickup element are manufactured so as to reduce the variations in the light intensity, the transmittance, and the sensitivity, the cost increases.

Moreover, nonuniformity of the intensity of light emitted from the light source causes nonuniform light intensities within an irradiated area to change the peak-peak value. It is therefore difficult to accurately identify the type of the recording medium. To eliminate or reduce the nonuniformity of the light intensity of the light source within the irradiated area, there is a need for a correction operation called shading correction. Shading correction is a correction method in which an image of a surface of a recording medium is captured a plurality of times with the movement of the recording medium, a difference value between an average of light intensity output values of all pixels within the captured image areas of the image and a light intensity output value of each of the pixels is determined, and the determined difference values are added to the light intensity output values of the corresponding pixels within the image of the surface of the recording medium when the type of the recording medium is identified. In the implementation of shading correction, therefore, a plurality of images of a surface of a recording medium are captured and a correction operation is performed using the values obtained by capturing the images, which requires a long time to identify the type of the recording medium.

SUMMARY OF THE INVENTION

Embodiments of the present invention provide an identification device that allows quick and accurate identification of the type of a recording medium.

In some embodiments, the present invention provides an identification device including an irradiation unit configured to irradiate a recording medium with light; a reading unit configured to read the light that is irradiated from the irradiation unit and that is reflected from the recording medium to obtain an image; a processing unit configured to process the image obtained by the reading unit to output a plurality of pixel data items each having a light intensity value; a calculation unit configured to calculate a value representing amounts of change by which the light intensity values of the plurality of pixel data items continuously increase and decrease; and an identification unit configured to identify the type of the recording medium on the basis of the value representing the amounts of change calculated by the calculation unit.

In some embodiments, the present invention provides an identification method including irradiating a recording medium with light; a reading step of reading the light that is reflected from the recording medium to obtain an image; processing the obtained image to output a plurality of pixel data items each having a light intensity value; calculating a value representing amounts of change by which the light intensity values of the plurality of pixel data items continuously increase and decrease; and identifying the type of the recording medium on the basis of the calculated value representing the amounts of change.

In some embodiments, the present invention provides an image forming apparatus including an image forming unit configured to form an image on a recording medium; a recording medium identifying device including an irradiation unit configured to irradiate the recording medium with light, a reading unit configured to read the light that is irradiated from the irradiation unit and that is reflected from the recording medium to obtain an image, a processing unit configured to process the image obtained by the reading unit to output a plurality of pixel data items each having a light intensity value, and a calculation unit configured to calculate a value representing amounts of change by which the light intensity values of the plurality of pixel data items continuously increase and decrease; and a control unit configured to control an image forming condition of the image forming unit on the basis of the value representing the amounts of change calculated by the calculation unit.

Further features of the present invention will become apparent from the following description of exemplary embodiments with reference to the attached drawings.

BRIEF DESCRIPTION OF THE DRAWINGS

FIG. 1 is a schematic cross-sectional view showing a structure of an identification device according to an embodiment of the present invention.

FIGS. 2A to 2F are diagrams showing a relationship between a surface of a recording medium read by a reading unit of the identification device shown in FIG. 1 and an image obtained by digitally processing a portion of an output (image) from the reading unit into 8×8 pixels.

FIG. 3 is a diagram showing a plurality of pixels (areas) of an image of a surface of a recording medium PM read by the reading unit of the identification device shown in FIG. 1.

FIG. 4 is a graph showing light intensity output values obtained from pixels in the m-th row ($1 \leq m \leq \beta$) in an image of a surface of a recording medium, which is formed of the $\alpha \times \beta$ pixels shown in FIG. 3.

FIG. 5 is a diagram showing an example of light intensity output values obtained from a plurality of pixels constituting the image of the surface of the recording medium.

FIG. 6 is a diagram showing results of the determination of a difference value, a sign thereof, and a consecutive count value for the data shown in FIG. 5.

FIG. 7 is a diagram showing results of consecutive-number-of-time integral values determined by an analysis unit from images that are obtained by reading three types of plain paper, two types of glossy paper, one type of rough paper, and one type of glossy film using the reading unit and that are not shading-corrected.

FIG. 10 is a diagram showing an example of light intensity (light intensity of light transmitted through a recording medium) output values obtained from a plurality of pixels constituting an image of a surface of a recording medium.

FIG. 11 is a diagram showing results of the determination of a difference value, a sign thereof, and a consecutive count value for the data shown in FIG. 10.

FIG. 12 is a diagram showing results of consecutive-number-of-time integral values determined by an analysis unit from images that are obtained by reading three types of plain paper, two types of glossy paper, one type of rough paper, and one type of glossy film using a reading unit and that are not shading-corrected.

FIG. 16 is a diagram showing an example of light intensity output values obtained from a plurality of pixels constituting an image of a surface of a recording medium.

FIG. 17 is a diagram showing results of the determination of a difference value, a sign thereof, and a monotonically increasing consecutive-number-of-time count value for the data shown in FIG. 16.

FIG. 18 is a diagram showing results of monotonically increasing consecutive-number-of-time integral values t determined by an analysis unit from images that are obtained by reading three types of plain paper, two types of glossy paper, one type of rough paper, and one type of glossy film using a reading unit and that are not shading-corrected.

DESCRIPTION OF THE EMBODIMENTS

Figure 8:
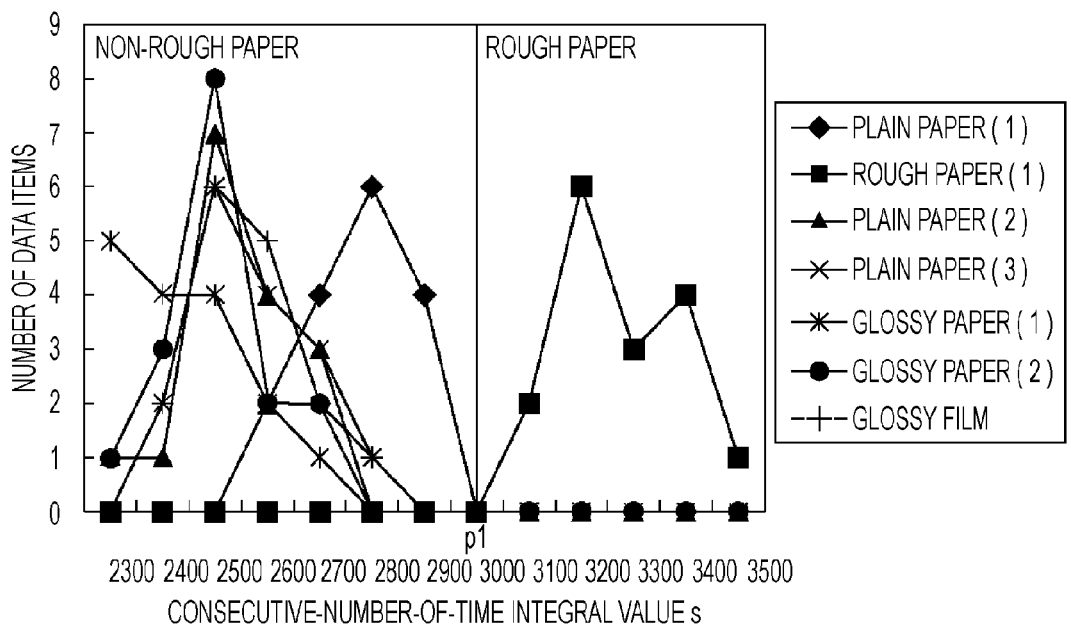
FIG. 8 is a graph showing the data shown in FIG. 7, in which consecutive-number-of-time integral values are plotted on the abscissa axis and the number of data items is plotted on the ordinate axis.

Exemplary embodiments of the present invention will be described hereinafter with reference to the accompanying drawings. The same parts are designated by the same reference numerals throughout the figures, and a redundant description thereof is omitted.

First Embodiment

FIG. 1 is a schematic cross-sectional view showing a structure of an identification device 100 according to a first embodiment of the present invention. The identification device 100 is an identification device operable to identify the type of a recording medium PM (such as glossy paper, plain paper, or rough paper) that is placed in an image forming apparatus such as a copier or a laser printer to form an image on the recording medium PM. As shown in FIG. 1, the identification device 100 includes a light source 101 serving as an illumination unit, a light source control unit 102, a focusing lens 103, a reading unit 104, a storage unit 105, and an analysis unit 106. The identification device 100 may further include a conveying unit 107 operable to convey the recording medium PM. In the first embodiment, the identification device 100 further includes the conveying unit 107. The recording medium PM is conveyed by the conveying unit 107 in a direction A shown in FIG. 1. The recording medium PM is irradiated with light from the light source 101 and the reading unit 104 performs an operation of reading an image in a state where the recording medium PM is pinched and retained by the conveying unit 107.

The light source 101 is formed of, for example, a light emitting diode (LED), and is operable to irradiate a surface of the recording medium PM with light. The light source control unit 102 controls the light source 101 so that the light intensity of light irradiated when the reading unit 104 reads an image of the recording medium PM, which will be described below, is constant. The light source 101 and the light source control unit 102 constitute an irradiation unit operable to irradiate the recording medium PM with light.

The focusing lens 103 focuses the light reflected from the surface of the recording medium PM into an image on the reading unit 104.

The reading unit 104 reads an irradiated area (i.e., a captured-image area) of the recording medium PM irradiated with the light by the light source 101 to obtain an image, and outputs the image to the storage unit 105. The reading unit 104 includes, for example, a CCD sensor or CMOS area sensor having a plurality of pixels each adapted to output an analog signal. The image read by the reading unit 104 is formed of the plurality of pixels.

The storage unit 105 stores an image formed of pixels arranged in at least one row in the image output from the reading unit 104. In the first embodiment, the image of the recording medium PM read by the reading unit 104 is stored in the storage unit 105. Alternatively, the reading unit 104 may directly output the read image to the analysis unit 106, or the analysis unit 106 may include a function of the storage unit 105.

The analysis unit 106 analyzes the image stored in the storage unit 105. More specifically, the analysis unit 106 analyzes the state of the surface of the recording medium PM on the basis of the continuity of changes in the light intensities of pixels arranged according to a predetermined rule (in the first embodiment, pixels in one row) among the plurality of pixels constituting the image of the recording medium PM. The continuity of changes in light intensity refers to amounts of change by which the light intensities of the pixels arranged according to a predetermined rule are continuously changed. The amounts of change are numerical representations of whether the light intensities of the pixels tend to continuously increase or tend to continuously decrease, the details of which will be described below. The analysis unit 106 also functions as an identification unit operable to identify the type of the recording medium PM on the basis of the analyzed state of the surface of the recording medium PM. The analysis operation of the analysis unit 106 will be described in detail below.

The conveying unit 107 is operable to retain the recording medium PM and to convey the recording medium PM. In other words, the conveying unit 107 allows the recording medium PM to move to change the irradiated area (captured-image area) of the recording medium PM irradiated with the light by the light source 101. In the first embodiment, the conveying unit 107 includes two pairs of rollers, which allow the recording medium PM to move in the direction A (as indicated by an arrow) shown in FIG. 1.

The light from the light source 101 impinges on the surface of the recording medium PM at a certain angle. The light reflected from the surface of the recording medium PM is focused into an image on the reading unit 104 through the focusing lens 103, which is read by the reading unit 104 as an image of the surface of the recording medium PM.

FIGS. 2A to 2F are diagrams showing a relationship between an image of the surface of the recording medium PM read by the reading unit 104 and an image obtained by digitally processing a portion of an output (image) from the reading unit 104 into a block of 8×8 pixels. The term "digitally processing" means converting an analog signal output from the reading unit 104 into, for example, 8-bit pixel data by A/D conversion in the first embodiment.

FIG. 2A shows an enlarged image of a surface of rough paper having a relatively rough surface and facilitating recognition of irregularities in the fiber of the paper. FIG. 2B shows an enlarged image of a surface of plain paper generally used in offices. FIG. 2C shows an enlarged image of a surface of glossy paper with few irregularities in which the paper fiber is sufficiently compressed. In this manner, the image of the surface of the recording medium PM differs depending on the type of the recording medium PM. This phenomenon is mainly caused due to the difference in the states of the fiber on the surface of paper.

The images shown in FIGS. 2A to 2C read by the reading unit 104 are converted into images (pixel data) shown in FIGS. 2D to 2F, respectively, by the digital processing operation described above.

The identification device 100 is configured to identify the type of the recording medium PM from the image obtained by digitally processing the image of the surface of the recording medium PM read by the reading unit 104. More specifically, as shown in FIG. 3, the identification device 100 stores light intensity output values of pixels in one row in the image of the surface of the recording medium PM formed of $\alpha \times \beta$ pixels (areas) in the storage unit 105 on a pixel-by-pixel basis. In the identification device 100, then, the analysis unit 106 analyzes changes in the light intensity output values of the pixels in the row, which are stored in the storage unit 105, and identifies the type of the recording medium PM on the basis of the analysis result. In the first embodiment, only pixels in one row of the image of the surface of the recording medium PM formed of $\alpha \times \beta$ pixels (areas) can be stored and analyzed. Alternatively, as described above, pixels arranged according to a predetermined rule may be stored and analyzed. The pixels arranged according to the predetermined rule are, for example, pixels in one column or diagonally adjacent pixels. Further, in the first embodiment, light intensity output values are stored pixel by pixel; however, light intensity output values may be stored in units of pixel areas each including a plurality of pixels. FIG. 3 is a diagram showing a plurality of pixels (areas) of the image of the surface of the recording medium PM read by the reading unit 104.

An analysis process performed by the analysis unit 106 on the light intensity output values stored in the storage unit 105, that is, an analysis process performed on the state of the surface of the recording medium PM, will now be described. FIG. 4 is a graph showing light intensity output values obtained from the pixels in the m-th row ($1 \leq m \leq \beta$) in the image of the surface of the recording medium PM formed of the $\alpha \times \beta$ pixels shown in FIG. 3. In the graph shown in FIG. 4, the abscissa axis denotes a pixel position and the ordinate axis denotes a light intensity output value. The pixels have light intensity output values $y_{n-2, m}$, $y_{n-1, m}$, $y_{n, m}$, $y_{n+1, m}$, $y_{n+2, m}$, etc. ($3 \leq n \leq \alpha-2$).

First, the analysis unit 106 determines a difference value $a_{n, m}$ between the light intensity output value $y_{n, m}$ obtained from the n-th pixel and the light intensity output value $y_{n+1, m}$ obtained from the (n+1)-th pixel among the pixels in the m-th row. The analysis unit 106 also determines a sign $b_{n, m}$ of the difference value $a_{n, m}$. More specifically, the analysis unit 106 determines the difference value $a_{n, m}$ and the sign $b_{n, m}$ of the difference value $a_{n, m}$ according to Eq. 1 as follows:

$$\begin{cases} \text{If} & a_{n,m} = y_{n,m} - y_{n-1,m} > 0, \text{ then } b_{n,m} = 1 \\ \text{If} & a_{n,m} = y_{n,m} - y_{n-1,m} = 0, \text{ then } b_{n,m} = 0 \\ \text{If} & a_{n,m} = y_{n,m} - y_{n-1,m} < 0, \text{ then } b_{n,m} = -1 \end{cases} \quad \text{Eq. 1}$$

(where $2 \leq \alpha \leq n$ and $1 \leq \beta \leq m$)

Then, the analysis unit 106 counts the number (hereinafter referred to as a "consecutive count value") $C_{n, m}$ of continuous sequences of the same sign (minus (−) or plus (+)) of the difference values for the pixels in the m-th row on the basis of the difference value $a_{n,m}$ and the sign $b_{n,m}$ of the difference value $a_{n,m}$, which are determined according to Eq. 1. More specifically, the analysis unit 106 determines the consecutive count value $C_{n,m}$ according to Eq. 2 as follows:

$$\begin{cases} \text{If } b_{n-1,m} = b_{n,m}, \text{ then } c_{n,m} = c_{n-1,m} + 1 \\ \text{If } b_{n-1,m} \neq b_{n,m}, \text{ then } c_{n,m} = 0 \end{cases} \quad \text{Eq. 2}$$

(where $2 \le \alpha \le n$ and $1 \le \beta \le m$)

The consecutive count value may include, in addition to the number of continuous sequences of the minus or plus sign, the number of continuous sequences of zero (0).

Further, the analysis unit 106 determines the consecutive count value $C_{n,m}$ from Eq. 2 using the pixel data of the $\alpha \times \beta$ pixels read by the reading unit 104, and integrates the determined count value $C_{n,m}$ to determine a consecutive-number-of-time integral value s. More specifically, the analysis unit 106 determines the consecutive-number-of-time integral value s according to Eq. 3 as follows:

$$s = \sum_{m=1}^{\beta} \sum_{n=2}^{\alpha} c_{n,m} \quad \text{Eq. 3}$$

The consecutive-number-of-time integral value s determined in the manner described above differs depending on the state of the surface of the recording medium PM. Therefore, the analysis unit 106 can determine the state of the surface of the recording medium PM on the basis of the consecutive-number-of-time integral value s.

Next, an example of analysis of the state of the surface of the recording medium PM according to the analysis process described above will be described. FIG. 5 is a diagram showing an example of the light intensity output values obtained from the plurality of pixels constituting the image of the surface of the recording medium PM. FIG. 6 shows results of the determination of the difference value $a_{n,m}$, the sign $b_{n,m}$, and the consecutive count value $C_{n,m}$, for the data shown in FIG. 5. Referring to FIG. 6, the consecutive-number-of-time integral value s for the pixels in the m-th row of the recording medium PM is 7.

FIG. 7 is a diagram showing results of the consecutive-number-of-time integral values s determined by the analysis unit 106 from images that are obtained by reading three types of plain paper, two types of glossy paper, one type of rough paper, and one type of glossy film using the reading unit 104 and that are not shading-corrected. FIG. 7 shows a list of 16 data items for each paper or film type. An area (image) of 1.28 mm by 1.28 mm of the recording medium PM is read using a CMOS area sensor of 0.64 mm by 0.64 mm as the reading unit 104 and a ½× reducing lens as the focusing lens 103. The CMOS area sensor has a size of 0.01 mm by 0.01 mm per pixel, and determines the consecutive-number-of-time integral value s from the light intensity output values obtained from 64×64 pixels (4096 pixels in total). The consecutive-number-of-time integral value s is a value obtained by, specifically, determining a consecutive-number-of-time integral value for each line of 64×64 pixels and accumulating the consecutive-number-of-time integral values for 64 lines.

FIG. 8 is a graph showing the data shown in FIG. 7 in which the consecutive-number-of-time integral value s is plotted on the abscissa axis and the number of data items is plotted on the ordinate axis. The data is plotted according to whether or not the consecutive-number-of-time integral value s on the abscissa axis of the graph is within any of the following set ranges: less than 2300, between 2300 and 2400, between 2401 and 2500, between 2501 and 2600, between 2601 and 2700, between 2701 and 2800, between 2801 and 2900, between 2901 and 3000, between 3001 and 3100, between 3101 and 3200, between 3201 and 3300, between 3301 and 3400, and between 3401 and 3500. Referring to FIG. 8, the consecutive-number-of-time integral value s of rough paper ranges from 2950 to 3500, and the consecutive-number-of-time integral value s of the types other than rough paper ranges from 2200 to 2900. Thus, as shown in FIG. 8, a threshold value p1 for identifying the type of the recording medium PM is set in a range between 2920 and 2940 to thereby distinguish rough paper from the types other than rough paper. The threshold value p1 is determined in advance and is stored in the storage unit 105.

There is a clear difference in the distribution of the consecutive-number-of-time integral values s between rough paper and the types other than rough paper for the following reason.

Since rough paper has a rough surface with large surface irregularities, light intensity output values of pixels in a given row gradually change over the pixels in the given row. In other words, light intensity output values of pixels in one row change so as to monotonically increase or decrease. Therefore, a large consecutive-number-of-time integral value s is obtained.

On the other hand, the types other than rough paper have small, minute surface irregularities, and light intensity output values of pixels in one row minutely change so as to alternately increase and decrease. Therefore, a small consecutive-number-of-time integral value s is obtained.

According to the first embodiment, there occurs a difference in the distribution of the consecutive-number-of-time integral values s between rough paper and the types other than rough paper. By setting the threshold value p1 to distinguish rough paper from the types other than rough paper, the recording medium PM is identified as rough paper or a type other than rough paper.

In the first embodiment, further, the consecutive number of times changes in the light intensities of pixels in at least one row of an image read by the reading unit 104 include consecutive increases is calculated to determine a first calculation value. Likewise, the consecutive number of times changes in the light intensities of pixels in at least one row of an image read by the reading unit 104 include consecutive decreases is calculated to determine a second calculation value. An integral (consecutive-number-of-time integral value s) of the first calculation value and the second calculation value is calculated, and is compared with a threshold value for identifying the type of the recording medium PM to thereby identify the type of the recording medium PM. Therefore, the identification device 100 can quickly and accurately identify the type of a recording medium without performing a shading correction, which is necessary for an existing method using a peak-peak value.

The consecutive number of times changes in the light intensities of pixels based on the state of a surface of a recording medium include consecutive increases or decreases is defined by, for example, a linear function $f(n)=n-1$ (where n is an integer not less than one). The present invention is not limited to a linear function, and may use any other function such as a quadratic function if the difference depending on the state of the surface of the recording medium is clearly determined.

Second Embodiment

Figure 9:
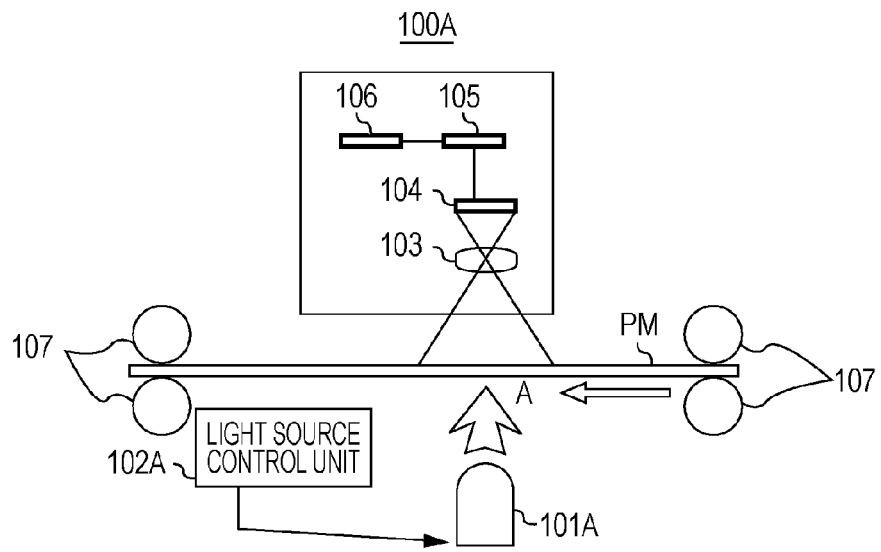
FIG. 9 is a schematic cross-sectional view showing a structure of an identification device according another embodiment of the present invention.

FIG. 9 is a schematic cross-sectional view showing a structure of an identification device 100A according to a second embodiment of the present invention. The identification device 100A is similar to the identification device 100, except for an irradiation unit including a light source 101A and a light source control unit 102A. As shown in FIG. 9, the identification device 100A includes the light source 101A, the light source control unit 102A, a focusing lens 103, a reading unit 104, a storage unit 105, and an analysis unit 106. The identification device 100 may further include a conveying unit 107 operable to convey a recording medium PM. In the second embodiment shown in FIG. 9, the identification device 100 further includes the conveying unit 107. The conveying operation of the conveying unit 107 is similar to that in the first embodiment, and a description thereof is thus omitted.

The light source 101A is placed on a side of the recording medium PM opposite to the side on which the reading unit 104 is placed, and is operable to irradiate the recording medium PM with light so as to transmit the light from a back surface of the recording medium PM to a front surface thereof. The reading unit 104 receives the light transmitted through the recording medium PM via the focusing lens 103. In other words, the reading unit 104 reads a light-transmission area (captured-image area) of the recording medium PM through which the light from the light source 101A is transmitted, and obtains an image. The light source control unit 102A controls the light source 101A so that the intensity of the light irradiated when the reading unit 104 reads the image of the recording medium PM is constant.

The analysis unit 106 performs an analysis process similar to that of the first embodiment to determine a consecutive-number-of-time integral value s from the image of the surface of the recording medium PM.

FIG. 10 is a diagram showing an example of light intensity (light intensity of light transmitted through the recording medium PM) output values obtained from a plurality of pixels constituting the image of the surface of the recording medium PM. FIG. 11 shows results of the determination of the difference value $a_{n,m}$, the sign $b_{n,m}$, and the consecutive count value $C_{n,m}$ for the data shown in FIG. 10 in a manner similar to that of the first embodiment. Referring to FIG. 11, the consecutive-number-of-time integral value s for the pixels in the m-th row of the recording medium PM is 2.

FIG. 12 is a diagram showing results of the consecutive-number-of-time integral values s determined by the analysis unit 106 from images that are obtained by reading three types of plain paper, two types of glossy paper, one type of rough paper, and one type of glossy film using the reading unit 104 and that are not shading-corrected. FIG. 12 shows a list of 16 data items for each paper or file type. An area (image) of 1.28 mm by 1.28 mm of the recording medium PM is read using a CMOS area sensor of 0.64 mm by 0.64 mm as the reading unit 104 and a ½× reducing lens as the focusing lens 103. The CMOS area sensor has a size of 0.01 mm by 0.01 mm per pixel, and determines the consecutive-number-of-time integral value s from the light intensity output values obtained from 64×64 pixels (4096 pixels in total). The consecutive-number-of-time integral value s is a value obtained by, specifically, determining a consecutive-number-of-time integral value for each line of 64×64 pixels and accumulating the consecutive-number-of-time integral values for 64 lines.

Figure 13:
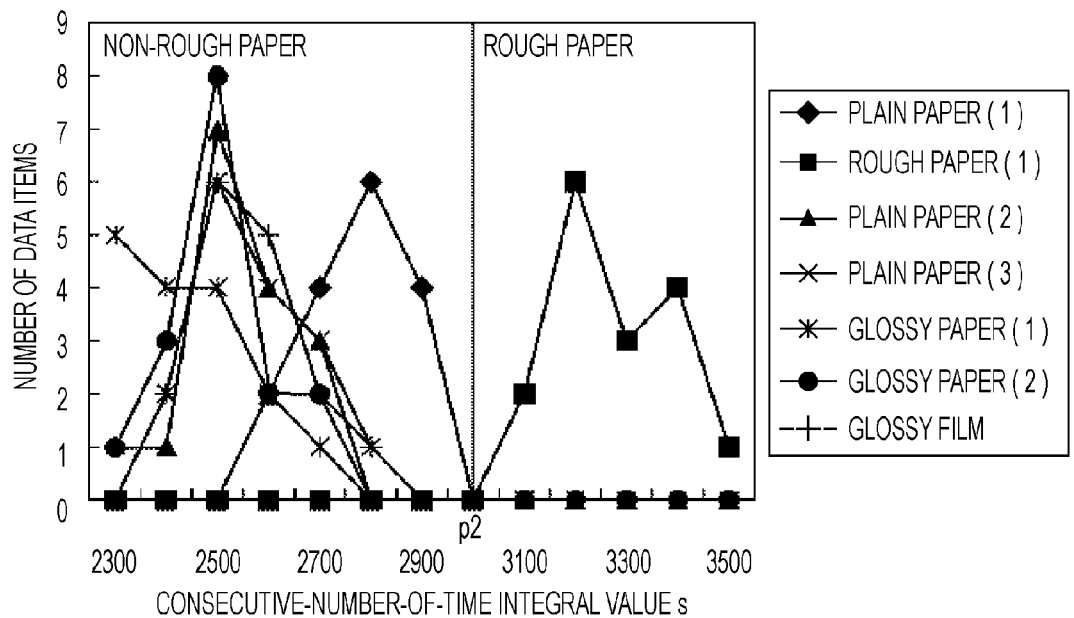
FIG. 13 is a graph showing the data shown in FIG. 12 in which consecutive-number-of-time integral values are plotted on the abscissa axis and the number of data items is plotted on the ordinate axis.

FIG. 13 is a graph showing the data shown in FIG. 12 in which the consecutive-number-of-time integral value s is plotted on the abscissa axis and the number of data items are plotted on the ordinate axis. The data is plotted according to whether or not the consecutive-number-of-time integral values on the abscissa axis of the graph is within any of the following set ranges: less than 2300, between 2300 and 2400, between 2401 and 2500, between 2501 and 2600, between 2601 and 2700, between 2701 and 2800, between 2801 and 2900, between 2901 and 3000, between 3001 and 3100, between 3101 and 3200, between 3201 and 3300, between 3301 and 3400, and between 3401 and 3500. Referring to FIG. 13, the consecutive-number-of-time integral value s of rough paper ranges from 3000 to 3500, and the consecutive-number-of-time integral value s of the types other than rough paper ranges from 2200 to 2900. Thus, as shown in FIG. 13, a threshold value p2 for identifying the type of the recording medium PM is set in a range between 2910 and 2980 to thereby distinguish rough paper from the types other than rough paper. The threshold value p2 is determined in advance and is stored in the storage unit 105.

There is a clear difference in the distribution of the consecutive-number-of-time integral values s between rough paper and the types other than rough paper for the following reason.

Since rough paper has a rough surface with large surface irregularities, the thickness of the paper largely changes. That is, light intensity output values of pixels in a given row of an image obtained on the basis of the light transmitted through the recording medium PM gradually change over the pixels in the given row. In other words, light intensity output values of pixels in one row change so as to monotonically increase or decrease. Therefore, a large consecutive-number-of-time integral value s is obtained.

On the other hand, the types other than rough paper have small, minute surface irregularities, and the thickness of the paper also minutely changes. Since light intensity output values of pixels in one row minutely change so as to alternately increase and decrease, a small consecutive-number-of-time integral value s is obtained.

According to the second embodiment, there occurs a difference in the distribution of the consecutive-number-of-time integral values s between rough paper and the types other than rough paper. By setting the threshold value p2 to distinguish rough paper from the types other than rough paper, the recording medium PM is identified as rough paper or a type other than rough paper.

In the second embodiment, further, the consecutive number of times changes in the light intensities of pixels in at least one row of an image read by the reading unit 104 include consecutive increases is calculated to determine a first calculation value. Likewise, the consecutive number of times changes in the light intensities of pixels in at least one row of an image read by the reading unit 104 include consecutive decreases is calculated to determine a second calculation value. An integral (consecutive-number-of-time integral value s) of the first calculation value and the second calculation value is calculated, and is compared with a threshold value for identifying the type of the recording medium PM to thereby identify the type of the recording medium PM. Therefore, the identification device 100A can quickly and accurately identify the type of a recording medium without performing a shading correction, which is necessary for an existing method using a peak-peak value.

The consecutive number of times changes in the light intensities of pixels based on the state of the surface of a recording medium include consecutive increases or decreases is defined by, for example, a linear function $f(n)=n-1$ (where n is an integer not less than one). The present invention is not limited to a linear function, and may use any other function such as a quadratic function if the difference depending on the state of the surface of the recording medium is clearly determined.

Third Embodiment

Figure 14:
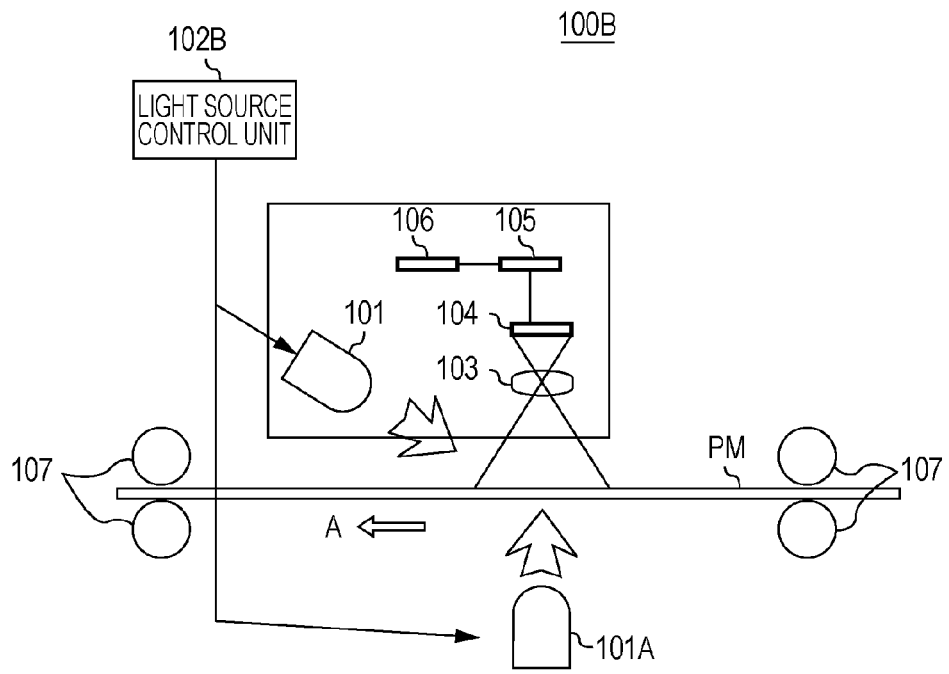
FIG. 14 is a schematic cross-sectional view showing a structure of an identification device according to another embodiment of the present invention.

FIG. 14 is a schematic cross-sectional view showing a structure of an identification device 100B according to a third embodiment of the present invention. The identification device 100B is an identification device mounted in an image forming apparatus such as a copier or a laser printer, and is adapted to identify the type of a recording medium PM (such as glossy paper, plain paper, or rough paper) on which an image is formed. As shown in FIG. 14, the identification device 100B includes a light source 101, a light source 101A, a light source control unit 102B, a focusing lens 103, a reading unit 104, a storage unit 105, and an analysis unit 106. The identification device 100 may further include a conveying unit 107 operable to convey the recording medium PM. In the third embodiment shown in FIG. 14, the identification device 100 further includes the conveying unit 107. The conveying operation of the conveying unit 107 is similar to that in the first embodiment, and a description thereof is thus omitted.

The light source 101 is placed so as to irradiate the recording medium PM with light from a surface of the recording medium PM, and the light source 101A is placed so as to irradiate the recording medium PM with light from a back surface thereof. The light source control unit 102B controls the light sources 101 and 101A so that the intensity of the light irradiated when the reading unit 104 reads the image of the recording medium PM is constant. The light source 101 and the light source control unit 102B constitute a first irradiation unit adapted to irradiate the surface of the recording medium PM with light, and the light source 101A and the light source control unit 102B constitutes a second irradiation unit adapted to irradiate the recording medium PM with light so as to transmit the light from the back surface to the surface thereof.

The reading unit 104 reads an irradiated area (captured-image area) of the recording medium PM irradiated with the light from the light source 101 (first irradiation unit) to obtain a first image, and reads a light-transmission area (captured-image area) of the recording medium PM through which the light from the light source 101A (second irradiation unit) is transmitted to obtain a second image.

The analysis unit 106 performs an analysis process similar to that of the first embodiment to determine a consecutive-number-of-time integral value s from each of the first and second images of the front surface of the recording medium PM.

Figure 15:
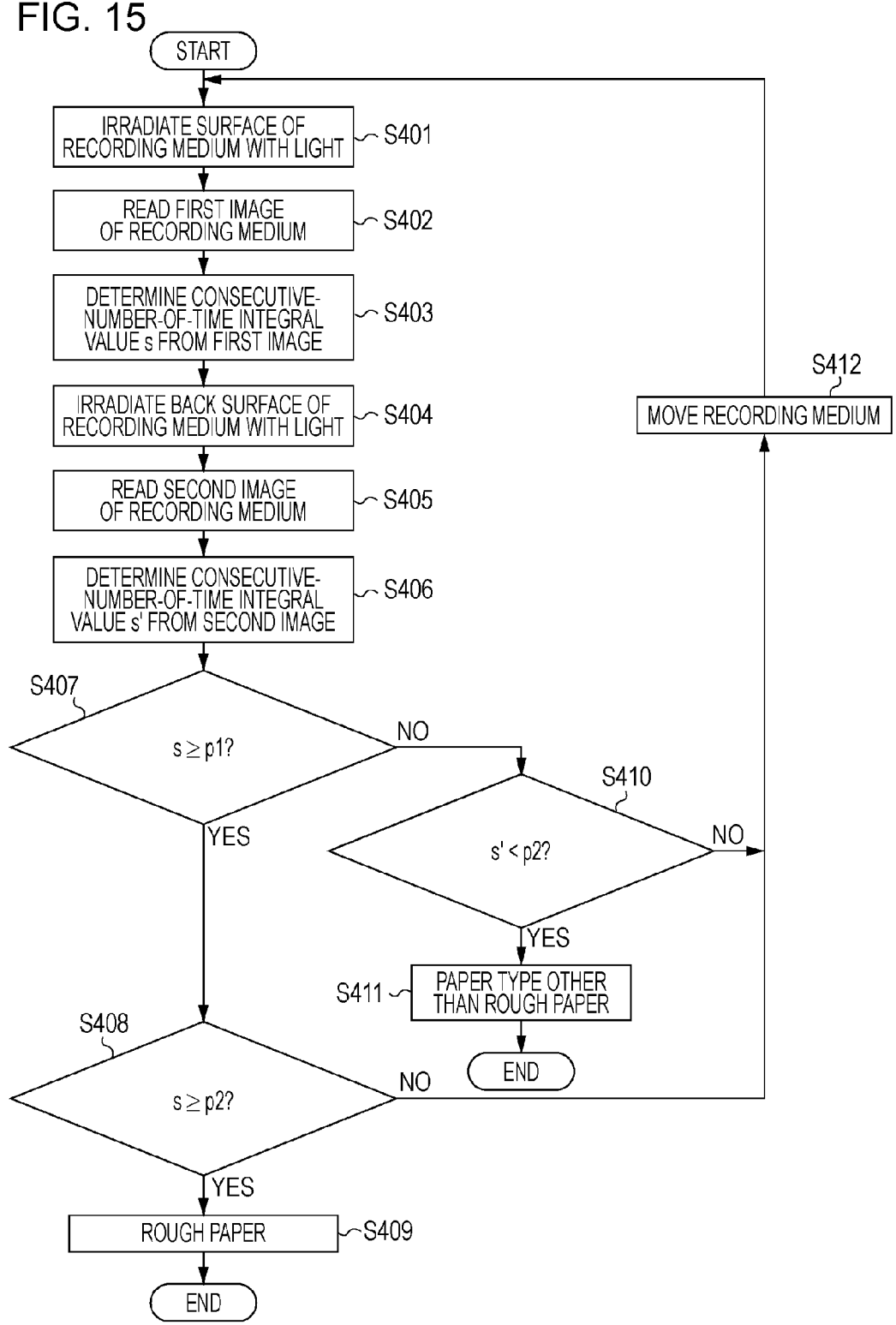
FIG. 15 is a flowchart showing an identification method for identifying the type of a recording medium.

An identification method for identifying the type of the recording medium PM according to the third embodiment will be described with reference to FIG. 15. FIG. 15 is a flowchart showing an identification method for identifying the type of the recording medium PM.

First, in step S401, the light source 101 of the first irradiation unit irradiates the surface of the recording medium PM with light. Then, in step S402, the reading unit 104 reads the first image of the recording medium PM. In step S403, the analysis unit 106 performs an analysis process similar to that of the first embodiment to determine a consecutive-number-of-time integral value s from the first image.

Then, in step S404, the light source 101A of the second irradiation unit irradiates the back surface of the recording medium PM with light. The light source 101A irradiates the back surface of the recording medium PM with light so that the captured-image area of the recording medium PM from which the first image is read coincides with the captured-image area of the recording medium PM from which the second image is to be read. Then, in step S405, the reading unit 104 reads the second image of the recording medium PM. In step S406, the analysis unit 106 performs an analysis process similar to that of the first embodiment to determine a consecutive-number-of-time integral value s' from the second image.

The consecutive-number-of-time integral values s and s' determined in steps S403 and S406 are compared with predetermined threshold values p1 and p2 to identify the type of the recording medium PM (steps S407 to S411).

First, in step S407, the analysis unit 106 compares the consecutive-number-of-time integral value s with the threshold value p1. If the consecutive-number-of-time integral value s is not less than the threshold value p1, the process proceeds to step S408. In step S408, the analysis unit 106 compares the consecutive-number-of-time integral value s' with the threshold value p2. If the consecutive-number-of-time integral value s' is not less than the threshold value p2, the process proceeds to step S409, in which the analysis unit 106 determines that the recording medium PM is rough paper. If, in step S408, the consecutive-number-of-time integral value is less than the threshold value p2, the process proceeds to step S412, in which the conveying unit 107 causes the recording medium PM to move to read an image in another captured-image area. Then, the process returns to step S401. Accordingly, the conveying unit 107 serves as a captured-image area changing unit adapted to change the captured-image area of the recording medium PM when the analyzed state of the surface of the recording medium PM based on the first image is different from the analyzed state of the surface of the recording medium PM based on the second image. However, the captured-image area changing unit is not limited to the conveying unit 107 that allows the recording medium PM to move. Alternatively, the captured-image area of the recording medium PM may be changed by changing the positions (irradiated areas) of the light emitted from the light sources 101 and 101A.

If, in step S407, the consecutive-number-of-time integral value s is less than the threshold value p1, the process proceeds to step S410, in which the analysis unit 106 compares the consecutive-number-of-time integral value s' with the threshold value p2. If, in step S410, the consecutive-number-of-time integral value s' is less than the threshold value p2, the analysis unit 106 determines that the recording medium PM is a type other than rough paper. If, in step S410, the consecutive-number-of-time integral value s' is not less than the threshold value p2 (that is, the consecutive-number-of-time integral value s is less than the threshold value p1 and the consecutive-number-of-time integral value s' is not less than the threshold value p2), the process proceeds to step S412, in which the conveying unit 107 causes the recording medium PM to move to read an image on another captured-image area.

In the third embodiment, an analysis result based on the first image of the recording medium PM and an analysis result based on the second image of the recording medium PM are used to identify the type of the recording medium PM. If the identified types are different from each other, the captured-image area of the recording medium PM is changed to read an image again to thereby identify the type of the recording medium PM. Therefore, the identification device 100B can identify the type of the recording medium PM with a higher accuracy than that of the identification of the type of the recording medium PM using an analysis result based on a single image.

Fourth Embodiment

An identification device according to a fourth embodiment of the present invention has a similar structure to that of the identification device according to the first embodiment, and a description thereof is thus omitted. The fourth embodiment employs an analysis process performed by the analysis unit 106 on the state of the surface of the recording medium PM, which is different from that of the first embodiment.

The analysis process performed by the analysis unit 106 on the state of the surface of the recording medium PM according to the fourth embodiment will now be described. It is assumed that the light intensity output values shown in FIG. 4 are obtained from pixels in the m-th row ($1 \leq m \leq \beta$) in an image of a surface of the recording medium PM formed of the $\alpha \times \beta$ pixels shown in FIG. 3.

As in the first embodiment, the analysis unit 106 determines a difference value $a_{n,m}$ between the light intensity output value $y_{n,m}$ obtained from the n-th pixel and the light intensity output value $y_{n+1,m}$ obtained from the (n+1)-th pixel among the pixels in the m-th row, and the sign $b_{n,m}$ of the difference value $a_{n,m}$.

Then, the analysis unit 106 determines a monotonically increasing consecutive-number-of-time count value $d_{n,m}$ according to Eq. 4 below from the difference value $a_{n,m}$ and the sign $b_{n,m}$ of the difference value $a_{n,m}$, which are determined according to Eq. 1:

$$\begin{cases} \text{If } b_{n-1,m} = b_{n,m} \text{ and } b_{n,m} = 1, \text{ then } d_{n,m} = d_{n-1,m} + 1 \\ \text{Otherwise } d_{n,m} = 0 \end{cases} \quad \text{Eq. 4}$$

(where $2 \leq \alpha \leq n$ and $1 \leq \beta \leq m$)

Further, the analysis unit 106 determines the monotonically increasing consecutive-number-of-time count value $d_{n,m}$ from Eq. 4 using the $\alpha \times \beta$ pixel data read by the reading unit 104, and integrates the determined count value $d_{n,m}$ to determine a monotonically increasing consecutive-number-of-time integral value t. More specifically, the analysis unit 106 determines the monotonically increasing consecutive-number-of-time integral value t according to Eq. 5 as follows:

$$t = \sum_{m=1}^{\beta} \sum_{n=2}^{\alpha} d_{m,n} \quad \text{Eq. 5}$$

While, in the fourth embodiment, the analysis unit 106 determines the monotonically increasing consecutive-number-of-time integral value t, the analysis unit 106 may determine a monotonically decreasing consecutive-number-of-time integral value. In this case, a similar advantage can also be achieved.

The monotonically increasing consecutive-number-of-time integral value t determined in the manner described above differs depending on the type of the recording medium PM. Therefore, the analysis unit 106 can identify the type of the recording medium PM on the basis of the monotonically increasing consecutive-number-of-time integral value t.

Next, an example of analysis of the state of the surface of the recording medium PM according to the analysis process described above will be described. FIG. 16 is a diagram showing an example of the light intensity output values obtained from the plurality of pixels constituting the image of the surface of the recording medium PM. FIG. 17 shows results of the determination of the difference value $a_{n,m}$, the sign $b_{n,m}$, and the monotonically increasing consecutive-number-of-time count value $d_{n,m}$ for the data shown in FIG. 16. Referring to FIG. 17, the monotonically increasing consecutive-number-of-time integral value t for the pixels in the m-th row of the recording medium PM is 4.

FIG. 18 is a diagram showing results of the monotonically increasing consecutive-number-of-time integral values t determined by the analysis unit 106 from images that are obtained by reading three types of plain paper, two types of glossy paper, one type of rough paper, and one type of glossy film using the reading unit 104 and that are not shading-corrected. FIG. 18 shows a list of 16 data items for each paper or film type. An area (image) of 1.28 mm by 1.28 mm of the recording medium PM is read using a CMOS area sensor of 0.64 mm by 0.64 mm as the reading unit 104 and a ½× reducing lens as the focusing lens 103. The CMOS area sensor has a size of 0.01 mm by 0.01 mm per pixel, and determines the monotonically increasing consecutive-number-of-time integral value t from the light intensity output values obtained from 64×64 pixels (4096 pixels in total). The consecutive-number-of-time integral value t is a value obtained by, specifically, determining a consecutive-number-of-time integral value for each line of 64×64 pixels and accumulating the consecutive-number-of-time integral values for 64 lines.

Figure 19:
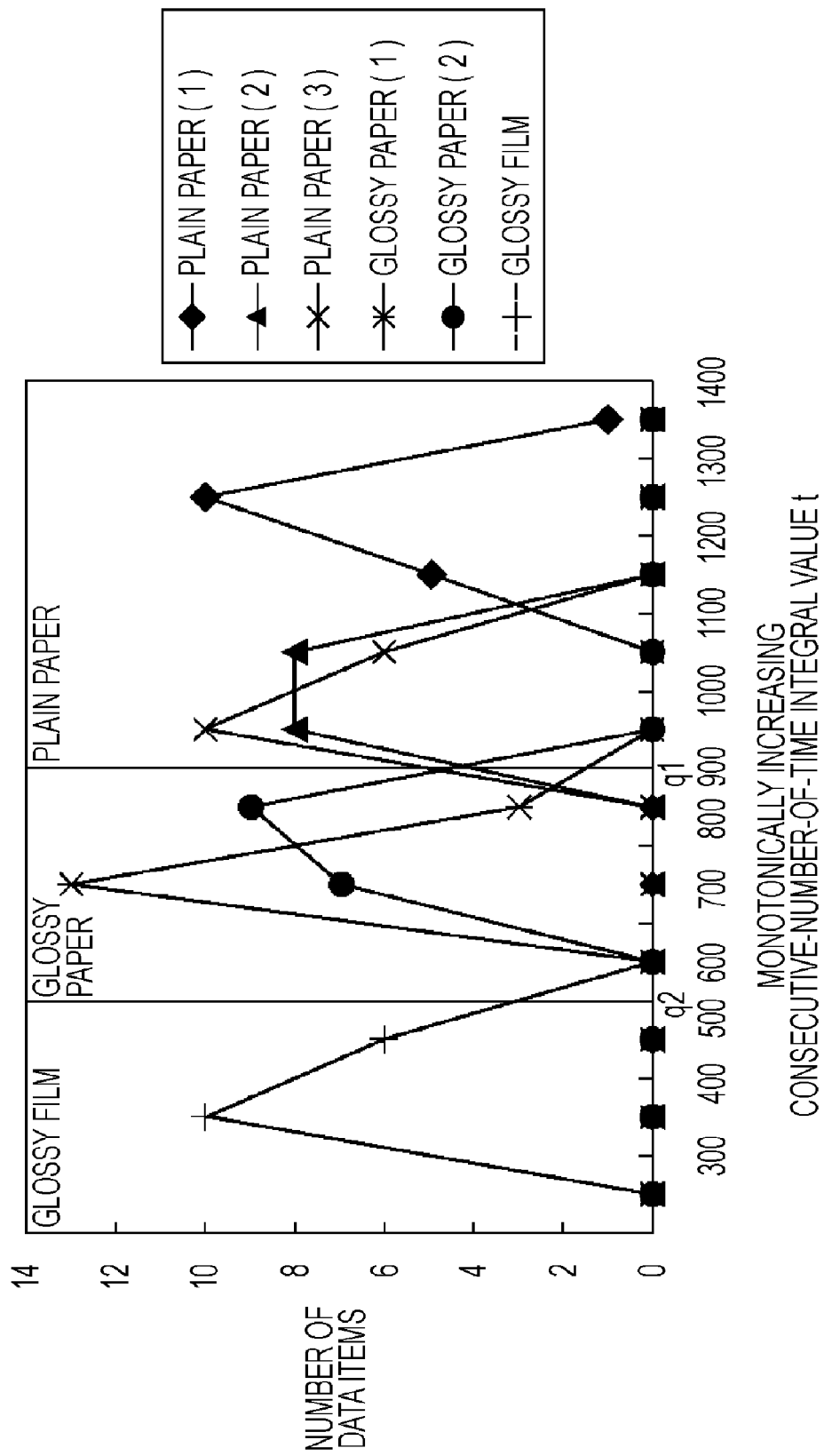
FIG. 19 is a graph showing the data shown in FIG. 18 in which a monotonically increasing consecutive-number-of-time integral value t is plotted on the abscissa axis and the number of data items is plotted on the ordinate axis.

FIG. 19 is a graph showing the data shown in FIG. 18 in which the monotonically increasing consecutive-number-of-time integral value t is plotted on the abscissa axis and the number of data items is plotted on the ordinate axis. The data is plotted according to whether or not the consecutive-number-of-time integral value t on the abscissa axis of the graph is within any of the following set ranges: less than 300, between 300 and 400, between 401 and 500, between 501 and 600, between 601 and 700, between 701 and 800, between 801 and 900, between 901 and 1000, between 1001 and 1100, between 1101 and 1200, and between 1201 and 1300. Referring to FIG. 19, the monotonically increasing consecutive-number-of-time integral value t of plain paper ranges from 900 to 1300, the monotonically increasing consecutive-number-of-time integral value t of glossy paper ranges from 700 to 800, and the monotonically increasing consecutive-number-of-time integral value t of glossy film ranges from 300 to 500. Thus, as shown in FIG. 19, a threshold value q1 for distinguishing between plain paper and glossy paper is set in a range between 820 and 870, and a threshold value q2 for distinguishing between glossy paper and glossy film is set in a range between 520 and 680. Therefore, plain paper, glossy paper, and glossy film can be distinguished from one another. The threshold values q1 and q2 are determined in advance and are stored in the storage unit 105.

The threshold values q1 and q2 are set using monotonically increasing consecutive-number-of-time integral values because monotonically increasing consecutive-number-of-time integral values exhibited clearer correspondences between integral values and paper types than monotonically decreasing consecutive-number-of-time integral values (see FIG. 19).

There is a clear difference in the distribution of the monotonically increasing consecutive-number-of-time integral values t between plain paper, glossy paper, and glossy film for the following reason.

These paper types show greater surface changes in an order of plain paper, glossy paper, and glossy film. Plain paper with rougher surface changes has a greater number of monotonic increases and has therefore a greater monotonically increasing consecutive-number-of-time integral value t.

On the other hand, glossy film with greater surface changes has a smaller number of monotonic increases and has therefore a smaller monotonically increasing consecutive-number-of-time integral value t.

In the fourth embodiment, by setting the threshold value q1 to distinguish between plain paper and glossy paper, and setting the threshold value q2 to distinguish between glossy paper and glossy film, the recording medium PM is identified as plain paper, glossy paper, or glossy film.

In the fourth embodiment, the consecutive number n of times changes in the light intensities of pixels in at least one row of an image read by the reading unit 104 include consecutive increases or decreases is calculated by a function f(n), and values obtained by the calculation are integrated. The integral value obtained by the integration is compared with the threshold values used for identifying the type of the recording medium PM to thereby identify the type of the recording medium PM. Therefore, the identification device of the fourth embodiment can quickly and accurately identify the type of a recording medium without performing a shading correction, which is necessary for an existing method using a peak-peak value.

Fifth Embodiment

Figure 20:
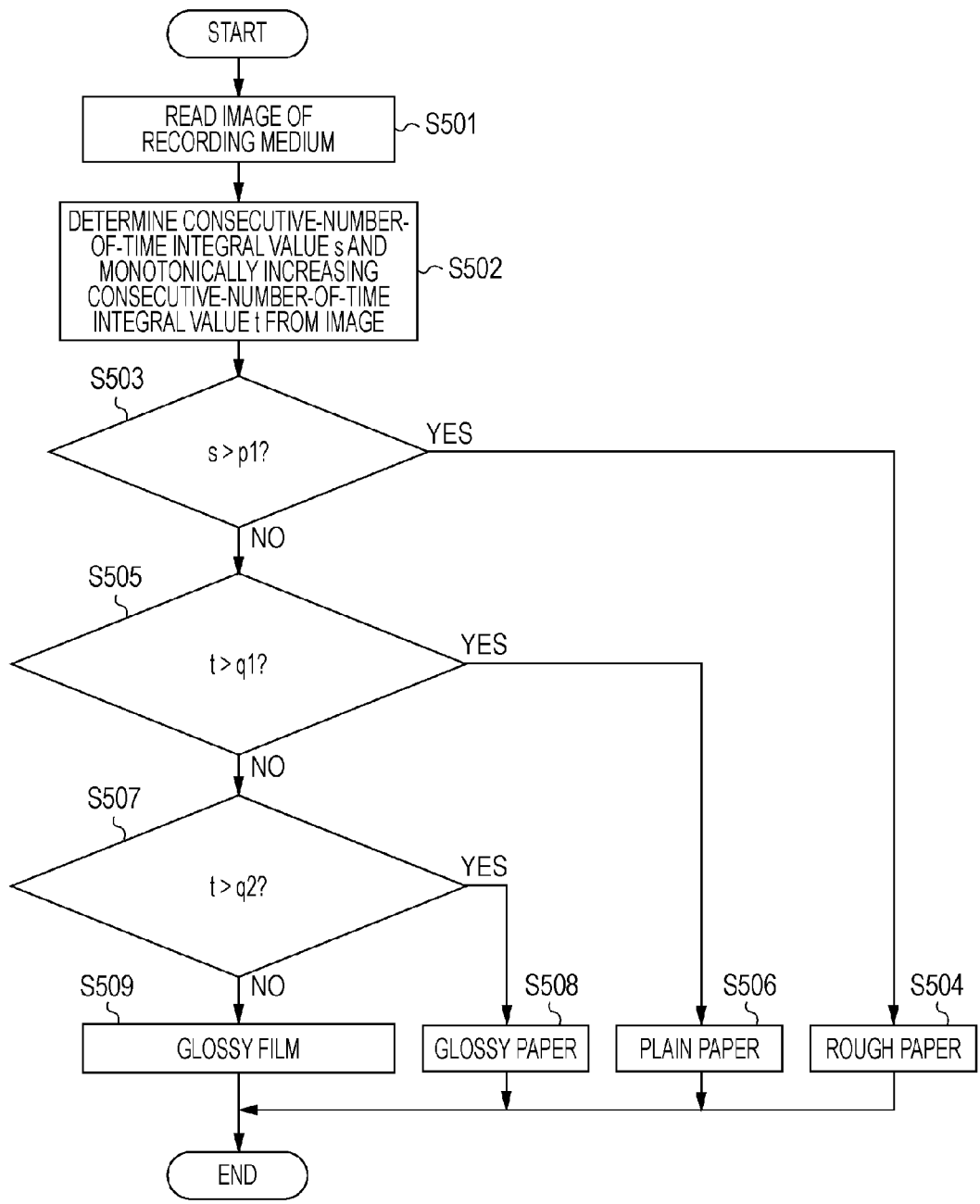
FIG. 20 is a flowchart showing an identification method for identifying the type of a recording medium.

An identification device according to a fifth embodiment of the present invention has a similar structure to that of the identification device according to the first embodiment, and a description thereof is thus omitted. In the fifth embodiment, a method for identifying the type of the recording medium PM using the analysis process according to the first embodiment and the analysis process according to the fourth embodiment will be described. FIG. 20 is a flowchart showing an identification method for identifying the type of the recording medium PM.

First, in step S501, the reading unit 104 reads an image of a surface of the recording medium PM. Then, in step S502, the analysis unit 106 determines a consecutive-number-of-time integral value s and a monotonically increasing consecutive-number-of-time integral value t from the image read in step S501 according to the analysis processes of the first and fourth embodiments.

In step S503, the analysis unit 106 compares the consecutive-number-of-time integral value s determined in step S502 with the predetermined threshold value p1 (see FIG. 8). If the consecutive-number-of-time integral value s is greater than the threshold value p1, the process proceeds to step S504, in which the analysis unit 106 determines that the recording medium PM is rough paper.

If, in step S503, the consecutive-number-of-time integral value s is not greater than the threshold value p1, the process proceeds to step S505, in which the analysis unit 106 compares the monotonically increasing consecutive-number-of-time integral value t determined in step S502 with the predetermined threshold value q1. If, in step S505, the monotonically increasing consecutive-number-of-time integral value t is greater than threshold value q1, the process proceeds to step S506, in which the analysis unit 106 determines that the recording medium PM is plain paper.

If, in step S505, the monotonically increasing consecutive-number-of-time integral value t is not greater than the threshold value q1, the process proceeds to step S507, in which the analysis unit 106 compares the monotonically increasing consecutive-number-of-time integral value t determined in step S502 with the predetermined threshold value q2. If, in step S507, the monotonically increasing consecutive-number-of-time integral value t is greater than the threshold value q2, the process proceeds to step S508, in which the analysis unit 106 determines that the recording medium PM is glossy paper. If, in step S507, the monotonically increasing consecutive-number-of-time integral value t is not greater than the threshold value q2, the process proceeds to step S509, in which the analysis unit 106 determines that the recording medium PM is glossy film.

In the fifth embodiment, the consecutive number n of times changes in the light intensities of pixels in at least one row of an image read by the reading unit 104 include consecutive increases is calculated by a function f(n), and values obtained by the calculation are integrated to determine a first integral value. Likewise, the consecutive number m of times changes in the light intensities of pixels in at least one row of the image read by the reading unit 104 include consecutive decreases is calculated by a function f(m), and values obtained by the calculation are integrated to determine a second integral value. At least two or more of the first integral value, the second integral value, and the sum of the first integral value and the second integral value are compared with a plurality of threshold values to identify the type of the recording medium PM. Therefore, the identification device of the fifth embodiment can more accurately identify the type of a recording medium, such as rough paper, plain paper, glossy paper, or glossy film.

As described with respect to the first to fifth embodiments, in the identification device and method according to the present invention, for an image including irregularities information concerning a recording medium read by a reading unit, the continuity of changes in the light intensities of pixels constituting the image is analyzed, and the type of the recording medium is identified on the basis of a difference in the continuity. Therefore, an arrangement that is less susceptible to variations in light intensity of light from a light source or variation in sensitivity of a reading unit and that is more inexpensive than an existing arrangement using a peak-peak value can be achieved. Further, the range within which the light intensities vary from pixel to pixel is sufficiently greater than the range of variances caused by nonuniformity of the light intensity within an irradiated area (captured-image area) of the recording medium. Therefore, changes in the light intensity due to irregularities in the surface of the recording medium are less susceptible to nonuniformity of the intensity of light emitted from the light source. This ensures high identification accuracy without performing a shading correction to eliminate or reduce nonuniformity of the light intensity, and the time required to identify the recording medium can be reduced. The continuity of changes in the light intensity from pixel to pixel includes, for example, the consecutive number of times changes in light intensity include only repeated increases, and the consecutive number of times changes in light intensity include only repeated decreases.

Sixth Embodiment

Figure 21:
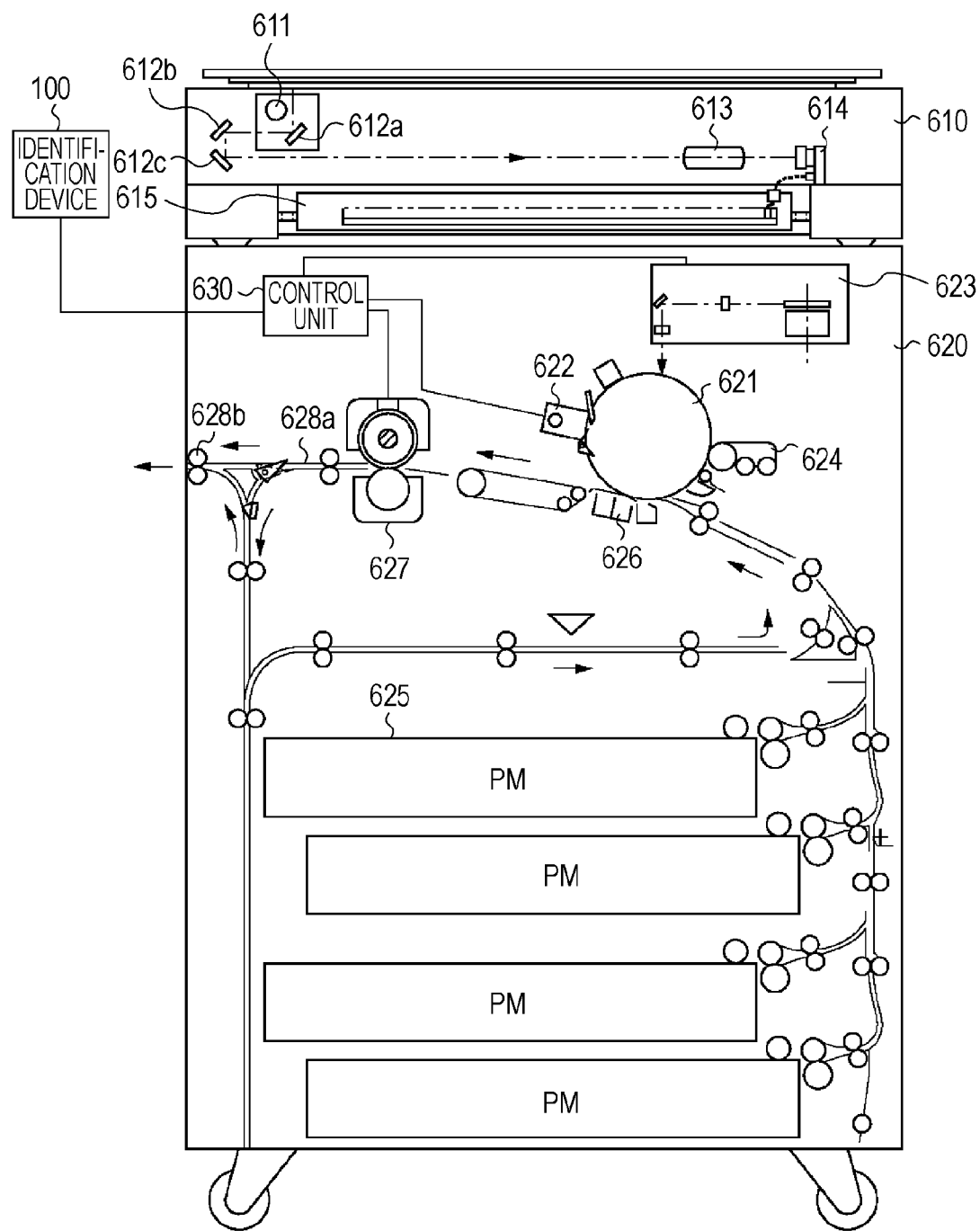
FIG. 21 is a schematic cross-sectional view showing a structure of an image forming apparatus including an identification device according to an embodiment of the present invention.

A sixth embodiment of the present invention will be described with respect to an image forming apparatus including an identification device according to embodiments of the present invention. FIG. 21 is a schematic cross-sectional view showing a structure of an image forming apparatus 600 including an identification device according to an embodiment of the present invention. While the image forming apparatus 600 includes the identification device 100 in the sixth embodiment, the image forming apparatus 600 may include the identification device 100A or 100B.

The image forming apparatus 600 is implemented as, for example, an electrophotographic laser printer, and is operable to form an image of an original document on a recording medium MP. As shown in FIG. 21, the image forming apparatus 600 includes an identification device 100, a scanner unit 610, an image forming unit 620, and a control unit 630.

The identification device 100 is operable to identify the type of the recording medium PM on which the image of the original document is to be formed. The identification device 100 may have any of the structures described above, and a detailed description thereof is omitted herein. The light source 101, light source control unit 102, focusing lens 103, reading unit 104, storage unit 105, and analysis unit 106 of the identification device 100 can be replaced by constituent members such as the scanner unit 610 and the control unit 630, which will be described below.

The scanner unit 610 includes an original document irradiation unit 611, scanning mirrors 612a to 612c, a lens 613, a CCD unit 614, and a scanner control unit 615. The original document irradiation unit 611 and the scanning mirror 612a are operable to scan an image of an original document placed on an original glass plate. Light reflected from the original document is directed to the lens 613 through the scanning mirrors 612a to 612c. The lens 613 focuses the light from the scanning mirror 612c onto the CCD unit 614. The CCD unit 614 reads the image of the original document. The scanner control unit 615 processes an image signal from the CCD unit 614, and outputs the resulting signal to the image forming unit 620.

The image forming unit 620 forms the image of the original document on the recording medium PM. The image forming unit 620 includes a photosensitive drum 621, a charging roller 622, a laser optical unit 623, a developer 624, a sheet feed unit 625, a transfer roller 626, a fixing unit 627, and sheet discharge rollers 628a and 628b.

The photosensitive drum 621 is formed of an organic photosensitive member or an amorphous silicon photosensitive member, and is driven to rotate clockwise at a predetermined peripheral speed (process speed) by way of example. The charging roller 622 uniformly charges a peripheral surface of the photosensitive drum 621 at a predetermined polarity and potential. The laser optical unit 623 irradiates the photosensitive drum 621 with laser light on the basis of image information (i.e., the image of the original document) from the scanner control unit 615. Thus, an electrostatic latent image corresponding to the image information is formed on the photosensitive drum 621. The developer 624 develops the electrostatic latent image formed on the photosensitive drum 621.

The sheet feed unit 625 feeds the recording medium PM to the photosensitive drum 621 via a sheet feed roller (not shown). The transfer roller 626 supplies an electric charge having a polarity opposite to that of toner from a back surface of the recording medium PM, and transfers a toner image (mirror toner image) onto the recording medium PM from the photosensitive drum 621. The recording medium PM onto which the toner image is transferred is separated from the photosensitive drum 621, and is thermally fixed with the toner image by the fixing unit 627. The recording medium PM thermally fixed with the toner image is discharged to a paper output tray through the sheet discharge rollers 628a and 628b.

The control unit 630 includes a central processing unit (CPU) and a memory (not shown), and is operable to control the operation of the image forming apparatus 600. In the sixth embodiment, the control unit 630 controls an image forming condition of the image forming unit 620 on the basis of an identification result of the identification device 100 (i.e., the type of the recording medium PM). More specifically, the control unit 630 controls image forming conditions including a temperature at which the fixing unit 627 heats the recording medium PM (fixing temperature), a speed at which the recording medium PM passes through the fixing unit 627, a printing density, a transfer bias, and a process speed. Therefore, optimal image forming conditions are set in the image forming apparatus 600 according to the type of the recording medium PM, and a high-quality image of the original document can be formed on the recording medium PM.

In the operation of the image forming apparatus 600, first, the identification device 100 identifies the type of the recording medium PM. The operation of identifying the type of the recording medium PM by the identification device 100 has been described, and a detailed description thereof is omitted. When the type of the recording medium PM is identified by the identification device 100, the control unit 630 controls an image forming condition of the image forming unit 620 on the basis of the type of the recording medium PM identified by the identification device 100. As described above, the identification device 100 allows quick and accurate identification of the type of the recording medium PM, and the image forming condition of the image forming unit 620 can also be quickly set to the optimum.

Then, the scanner unit 610 reads the image of the original document. More specifically, the original document irradiation unit 611 and the scanning mirror 612a move to scan the original document placed on the original glass plate. Light reflected from the original document is directed to the lens 613 through the scanning mirrors 612a to 612c, and is focused on the CCD unit 614 by the lens 613 so that the CCD unit 614 reads the image of the original document. The image of the original document read by the CCD unit 614 is processed by the scanner control unit 615, and is output to the image forming unit 620.

Then, the image forming unit 620 forms the image of the original document on the recording medium PM. More specifically, the laser optical unit 623 irradiates the photosensitive drum 621 with laser light corresponding to image information from the scanner control unit 615, and forms an electrostatic latent image of the image of the original document on the photosensitive drum 621. The electrostatic latent image formed on the photosensitive drum 621 is visualized (developed) as a toner image by supplying toner from the developer 624. The recording medium PM is fed by the sheet feed unit 625 in synchronization with the toner image on the photosensitive drum 621, and the toner image is transferred onto the recording medium PM by the transfer roller 626. The recording medium PM to which the toner image is transferred is separated from the photosensitive drum 621, and is transported to the fixing unit 627. The toner image transferred to the recording medium PM is thermocompressed by the fixing unit 627, and is fixed to the recording medium PM (the image of the original document is formed on the recording medium PM). The recording medium PM on which the image of the original document is formed is discharged to the paper output tray through the sheet discharge rollers 628a and 628b. As described above, an optimum image forming condition is set in the image forming unit 620 according to the type of the recording medium PM identified by the identification device 100, and a high-quality image can be formed on the recording medium PM. Therefore, the image forming apparatus 600 can quickly set an image forming condition in accordance with the type of the recording medium PM, and can form a high-quality image at a high throughput. Further, the identification device 100 having a simple structure without using a shading correction is used to determine the type of the recording medium PM, resulting in low cost of the apparatus.

While preferred embodiments of the present invention have been described, it is to be understood that the present invention is not limited to those embodiments, and a variety of modifications and changes can be made without departing from the scope of the invention.

The present invention is not limited to the embodiments described above, and may also encompass modifications having the same technical concept as that of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-003853 filed Jan. 11, 2007, which is hereby incorporated by reference herein in its entirety.

What is claimed is:

1. A recording medium identification device comprising:
an irradiation unit configured to irradiate a recording medium with light;
a reading unit configured to receive and read the light that is irradiated from the irradiation unit as an image having a plurality of pixels;
a calculation unit configured to calculate a difference in an output value among the plurality of pixels from output values of the image read by the reading unit;
a counting unit configured to count the number of times that a sign of the difference calculated by the calculation unit is the same as a sign of a next difference calculated; and
a control unit configured to identify the type of the recording medium on the basis of the number of times counted by the counting unit.

2. The recording medium identification device according to claim 1, wherein the counting unit counts the number when a value of subtraction of a value of a light amount of a second pixel adjacent to a first pixel from a value of a light amount of the first pixel is positive and a value of subtraction of a value of a light amount of a third pixel adjacent to the second pixel from the value of the light amount of the second pixel is also positive.

3. The recording medium identification device according to claim 1, wherein the counting unit counts the number when a value of subtraction of a value of a light amount of a second pixel adjacent to a first pixel from a value of a light amount of the first pixel is negative and a value of subtraction of a value of a light amount of a third pixel adjacent to the second pixel from the value of the light amount of the second pixel is also negative.

4. The recording medium identification device according to claim 1, wherein the counting unit counts the number when a value of subtraction of a value of a light amount of a second pixel adjacent to a first pixel from a value of a light amount of the first pixel is zero and a value of subtraction of a value of a light amount of a third pixel adjacent to the second pixel from the value of the light amount of the second pixel is also zero.

5. The recording medium identification device according to claim 1, wherein the control unit determines whether the recording medium is rough paper or not.

6. A recording medium identification device comprising:
an irradiation unit configured to irradiate a recording medium with light;
a reading unit configured to receive and read the light that is irradiated from the irradiation unit as an image having a plurality of pixels;
a calculation unit configured to calculate a difference in an output value among the plurality of pixels from output values of the image read by the reading unit;
a counting unit configured to count the number of times that the difference calculated by the calculation unit and a next difference calculated are positive and the differences increase consecutively; and
a control unit configured to identify the type of the recording medium on the basis of the number of times calculated by the calculation unit.

7. The recording medium identification device according to claim 6, wherein the counting unit counts the number when a value of subtraction of a value of a light amount of a second pixel adjacent to a first pixel from a value of a light amount of the first pixel is positive and a value of subtraction of a value of a light amount of a third pixel adjacent to the second pixel from the value of the light amount of the second pixel is also positive and larger than the value of subtraction of the value of the light amount of the second pixel from the value of the light amount of the first pixel.

8. The recording medium identification device according to claim 6, wherein the control unit determines whether the recording medium is a glossy film, glossy paper or plain paper.

9. A recording medium identification device comprising:
an irradiation unit configured to irradiate a recording medium with light;
a reading unit configured to receive and read the light that is irradiated from the irradiation unit as an image having a plurality of pixels;
a calculation unit configured to calculate a difference in an output value among the plurality of pixels from output values of the image read by the reading unit;
a counting unit configured to count the number of times that a sign of the difference calculated by the calculation unit is the same as a sign of a next difference calculated as a first value, and to count the number of times that the difference calculated by the calculation unit and a next difference calculated are positive and the differences increase consecutively as a second value; and
a control unit configured to identify the type of the recording medium on the basis of the first value and the second value obtained by the counting unit.

10. The recording medium identification device according to claim 9, wherein the control unit determines whether the recording medium is a glossy film, glossy paper or plain paper.

* * * * *